C
(12) United States Patent
Kozak et al.

(10) Patent No.: US 7,523,908 B2
(45) Date of Patent: Apr. 28, 2009

(54) DEVICE FOR SUPPORTING AND VERTICALLY ADJUSTING THE POSITION OF AN OBJECT UPON A SUPPORT STRUCTURE

(75) Inventors: Burton Kozak, Chicago, IL (US); Charles Semel, Chicago, IL (US)

(73) Assignee: Eazypower Corporation, Chicago, IL (US)

( * ) Notice: Subject to any disclaimer, the term of this patent is extended or adjusted under 35 U.S.C. 154(b) by 174 days.

(21) Appl. No.: 11/179,285

(22) Filed: Jul. 12, 2005

(65) Prior Publication Data
US 2007/0012842 A1 Jan. 18, 2007

(51) Int. Cl.
F16B 45/00 (2006.01)

(52) U.S. Cl. ............... 248/307; 248/295.11; 24/115 K; 403/80; 403/68

(58) Field of Classification Search ............... 248/307, 248/295.11, 297.21, 305, 306, 476, 477, 248/480, 495, 496, 225.21; 280/801.2; 297/353, 297/188.01, 188.03, 188.04, 188.06, 188.2, 297/463.1, 463.2; 403/68, 80, 103, 107, 403/108, 315, 319, 320; 24/115 K, 265 AL, 24/265 CD
See application file for complete search history.

(56) References Cited

U.S. PATENT DOCUMENTS

| | | | | | |
|---|---|---|---|---|---|
| 707,941 | A | * | 8/1902 | Pope | 248/48.1 |
| 931,399 | A | * | 8/1909 | Dusinberre | 248/70 |
| 935,797 | A | * | 10/1909 | Leonard | 248/496 |
| 1,136,005 | A | * | 4/1915 | Gumbel | 248/297.21 |
| 1,632,036 | A | * | 6/1927 | Mullen | 248/48.1 |
| 1,706,458 | A | * | 3/1929 | Mullen | 248/48.1 |
| 2,532,162 | A | * | 11/1950 | Goss | 248/477 |
| 2,569,622 | A | * | 10/1951 | Trainor | 248/477 |
| 2,696,962 | A | * | 12/1954 | Goss | 248/477 |
| 2,697,572 | A | * | 12/1954 | Pfankuch | 248/495 |
| 4,557,455 | A | * | 12/1985 | Benjamin | 248/496 |
| 5,584,462 | A | * | 12/1996 | Reese | 248/477 |
| 5,725,278 | A | * | 3/1998 | Verbeek | 297/353 |
| 5,853,222 | A | * | 12/1998 | Roslund et al. | 297/353 |
| 5,938,285 | A | * | 8/1999 | Verbeek | 297/353 |
| 6,105,182 | A | * | 8/2000 | Elnar | 4/541.1 |
| 6,575,416 | B1 | * | 6/2003 | Avinger | 248/307 |
| 6,666,425 | B1 | * | 12/2003 | Ferguson | 248/477 |
| 6,793,286 | B2 | * | 9/2004 | Burgin | 297/353 |
| 6,857,608 | B2 | * | 2/2005 | Avinger | 248/215 |
| 2006/0060748 | A1 | * | 3/2006 | Darre | 248/476 |

* cited by examiner

Primary Examiner—Kimberly T Wood
(74) Attorney, Agent, or Firm—Factor & Lake

(57) ABSTRACT

A device 10 for supporting and vertically adjusting the position of a picture or other object after the device 10 is secured to a support structure includes a first member 12 having an upper portion 14 that is secured to a wall or similar support structure, and a lower portion having a plurality of horizontally aligned and alternating ridges 42 and parallel arcuate depressions 44 that are adjacent and perpendicular to opposing vertical channels 22. The device further includes a second member 26 that is slidably secured to the first member 12 via skate members 28 inserted in the channels 22 of the first member 12. An annular hanger member 36 is joined to a lower end 38 of the plate portion 34 to removably receive a substantially "D" configured hanger 40 that supports the object. A locking rod 46 is ultimately inserted between the first and second members 12 and 26 such that the vertical position of the second member 26 and the object secured thereto is maintained without inserting fasteners through the second member 26 and into the support structure.

19 Claims, 10 Drawing Sheets

DEVICE FOR SUPPORTING AND VERTICALLY ADJUSTING THE POSITION OF AN OBJECT UPON A SUPPORT STRUCTURE

BACKGROUND OF THE INVENTION

1. Field of the Invention

The present invention relates to vertically adjustable support devices for positioning a painting or mirror upon a wall or other support structure and more particularly, to a device that adjusts the position of the object after a first or support member of the device has been secured to the wall, the device vertically positioning the object via a second member without fastening the second member to the wall thereby minimizing wall damage.

2. Background of the Prior Art

A plethora of wall mounted adjustable support devices are available for vertically adjusting pictures, paintings, mirrors or like objects upon a wall. The devices include adjusting screws that vertically position the object upon the wall as disclosed in U.S. Pat. No. 5,931,439 (Lemire) and U.S. Pat. No. 6,062,525 (Lemire). The problem with these patents is that the object must be removed from the wall to rotate the adjusting screws to reposition the object. Other devices use wires to vertically support an object as disclosed in U.S. Pat. No. 5,743,507 (Rushing) and U.S. Pat. No. 6,119,999 (Fleishman). The problem with the Rushing patent is that a relatively large baseplate must be used together with a threaded bolt and nut that are loosened and locked (upon removing the object) to repeatedly adjust the vertical position of the object. The problem with the Fleishman patent is that relatively long and unsightly wires are exposed to the viewer gazing upon the object. Wall mounted adjustable support devices further include relatively small devices as disclosed in U.S. Pat. No. 2,532,162 (Goss). The problem with the Goss patent is that after securing a first member to a wall, a second member that supports the object must also be secured to the wall to maintain the vertical position of the object thereby causing added damage to the wall each time the vertical position of the object is adjusted.

There is a need for a device for supporting and vertically adjusting the position of an object after the device is secured to the wall and without removing the object from the device. The device should be completely hidden behind the object and the device must be capable of vertically adjusting the object upon the wall without adding fasteners or otherwise further damaging the wall.

SUMMARY OF THE INVENTION

It is an object of the present invention to overcome many of the disadvantages associated with devices for supporting and vertically adjusting the position of an object after the device is secured to a support structure.

A principle object of the present invention is to provide a device that promotes vertical adjustment of an object such as a picture or mirror upon a wall after the device, with the object secured thereto, has been secured to the wall without adding fasteners to the device once a vertical elevation for the object has been selected. A feature of the device is two slidably joined members, a first member being attached to the wall, a second member being vertically adjustable relative to the first member. An advantage of the device is that the elevation of the second member is maintained by securing the second member to the first member. Another advantage of the device is that the elevation of the second member is maintained without securing the second member to the wall.

Another object of the present invention is to provide a device that does not damage a wall that the device is attached to. A feature of the device is that the only items that penetrate the wall are the fasteners that secure a first member of the device to the wall. An advantage of the device is that the elevation of an object secured to a second member of the device, may be incrementally adjusted and evaluated without further damage to the wall.

Yet another object of the present invention is to provide a device that vertically aligns the object being supported with the central axes of all components of the device. A feature of the device is a "D" configured hanger. An advantage of the device is that by vertically aligning the device and object, wall damage caused by the fasteners is minimized.

Still another object of the present invention is to provide a device that promotes varying vertical ranges that correspond to the object being supported. A feature of the device is that a plethora of first members having different vertical dimensions may be combined with a second member that supports the object. An advantage of the device is that a vertically "short" first member may be selected to secure pictures to a wall, pictures generally requiring little vertical adjustment. Another advantage of the device is that a vertically "long" first member may be selected to secure mirrors to a wall, mirrors generally require greater vertical adjustment depending upon the height of family members viewing the mirror.

Another object of the present invention is to varying incremental vertical adjustments that correspond to the object being supported. A feature of the device is alternating ridges and arcuate depressions horizontally disposed that ultimately receive a locking rod that secures the vertical position of the second member to the first member of the device. An advantage of the device is that the vertical distance separating adjacent ridges may be increased thereby reducing the adjustability of the device for objects such as mirrors being hung upon a wall. Another advantage of the device is that the vertical distance separating adjacent ridges may be decreased thereby increasing the adjustability of the device for objects such as pictures being hung upon a wall.

Another object of the present invention is to enable the device to maintain the vertical position of heavy objects secured to the device. A feature of the device is an arcuate retaining clip secured to an upper end of a second member. An advantage of the device is that the "holding" force generated by the arcuate retaining clip may be increased by disposing the clip closer to an arcuate depression and maintaining the diameter of a locking rod. Another advantage of the device is that the holding force generated by the arcuate retaining clip may be decreased by disposing the clip further from an arcuate depression and maintaining the diameter of a locking rod.

Another object of the present invention is to configure and dimension the device such that the device remains hidden behind the object being supported. A feature of the device is a first member that is dimensioned to correspond the size and elevation range of the object being supported. An advantage of the device is that it may be used to support a myriad of objects including but not limited to paintings, pictures and mirrors.

Another object of the present invention is to support an object upon a wall while allowing the vertical position of the object to be adjusted. A feature of the device is a locking rod capable of being separated from first and second members while the object is supported by the second member. An advantage of the device is that one person can adjusted the vertical position of the object while a second person determines the preferred elevation of the object.

Briefly, the invention provides a device for supporting and vertically adjusting the position of an object after the device is secured to a support structure comprising a first member secured to a support structure at a predetermined position; a second member removably secured to said first member, said second member including means for supporting an object; means for adjusting the vertical position of the object after said first member is secured to the support structure and after said second member is removably secured to said first member; and means for maintaining a selected vertical position of the object, said position maintaining means engaging only said first and second members.

The invention further provides a device for adjusting the vertical position of an object hung on a wall without damaging the wall comprising a corrugated member secured to the wall; a vertically adjustable support member slidably secured to said corrugated member; a hanger secured to a lower portion of said support member; and a locking rod removably secured between said corrugated member and said support member, said locking pin maintaining a selected vertical position of the object after said support member has been vertically slid to a position corresponding to said selected vertical position of the object, said maintaining of said selected vertical position of the object occurring without attaching said support member to the wall.

The invention further provides a method for adjusting the vertical position of an object while hanging on a wall, said method comprising the steps of securing a first member upon a preselected portion of the wall; slidably securing a second member to said first member; providing means for securing the object to said second member; and maintaining a selected vertical position of said second member relative to said first member without securing said second member to the wall.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DESCRIPTION OF THE PREFERRED EMBODIMENT

Figure 1:
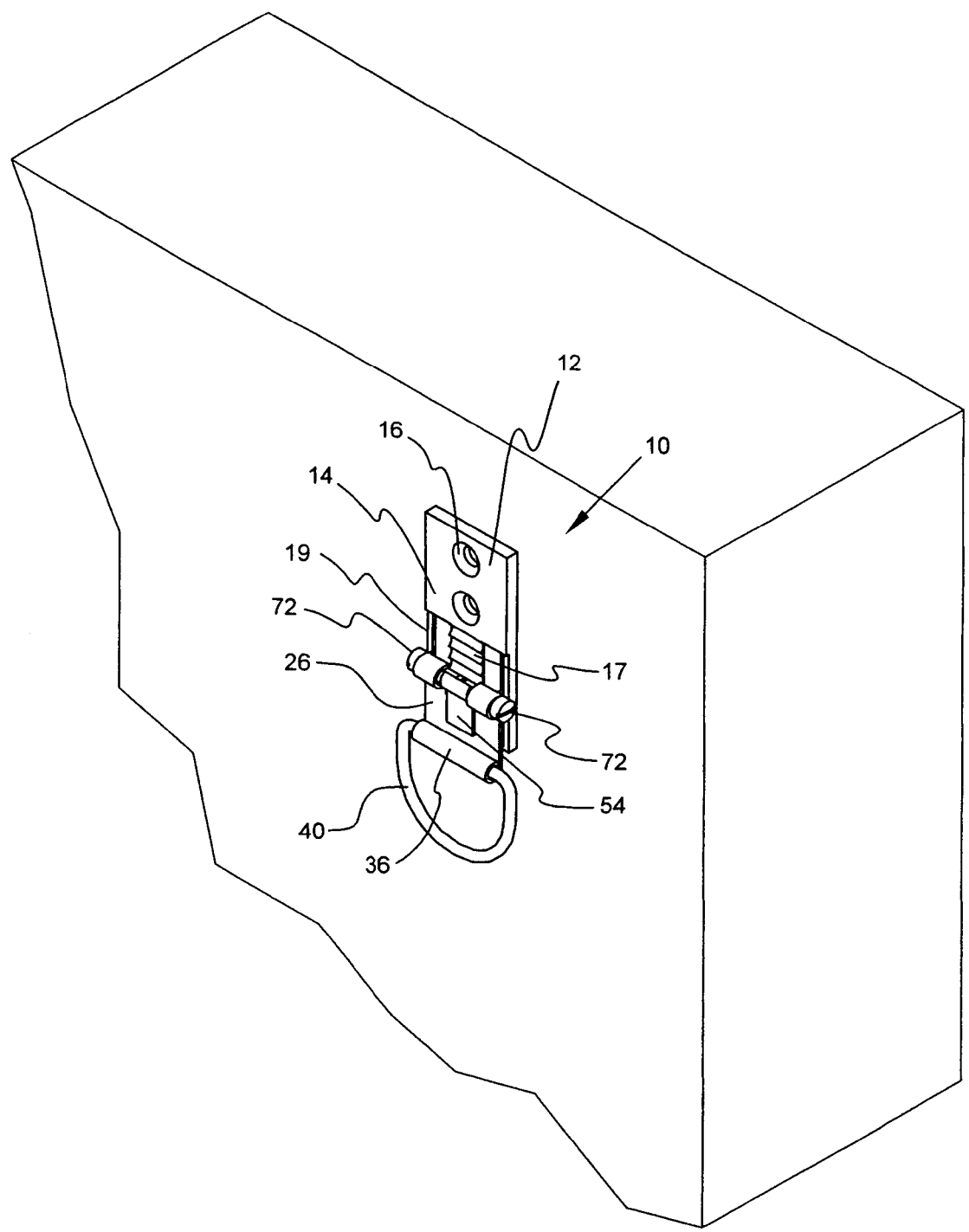
FIG. 1 is a perspective view of a device for supporting and vertically adjusting the position of an object after the device is secured to a support structure in accordance with the present invention.
Figure 2:
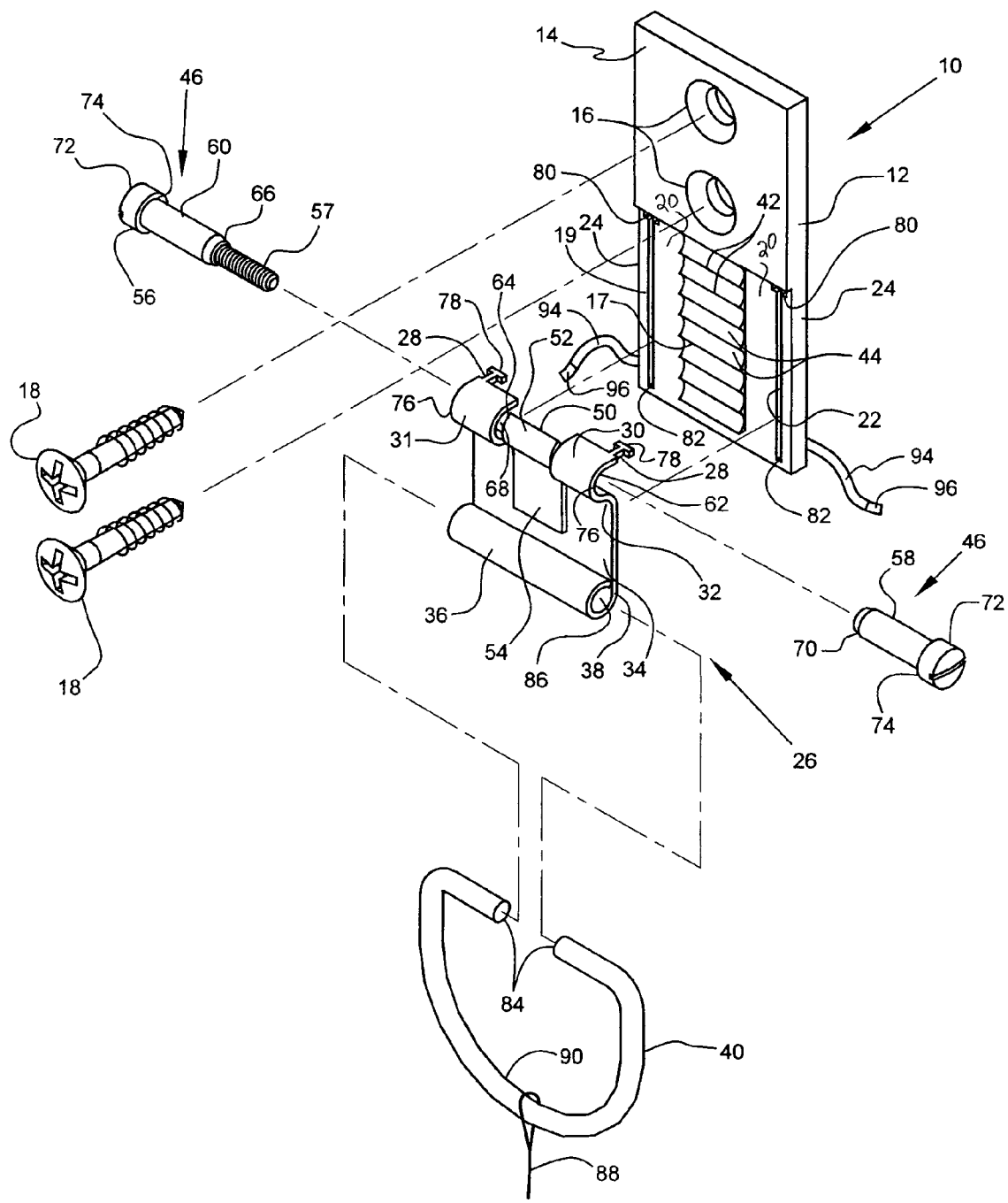
FIG. 2 is an exploded perspective view of the device of FIG. 1.
Figure 3:
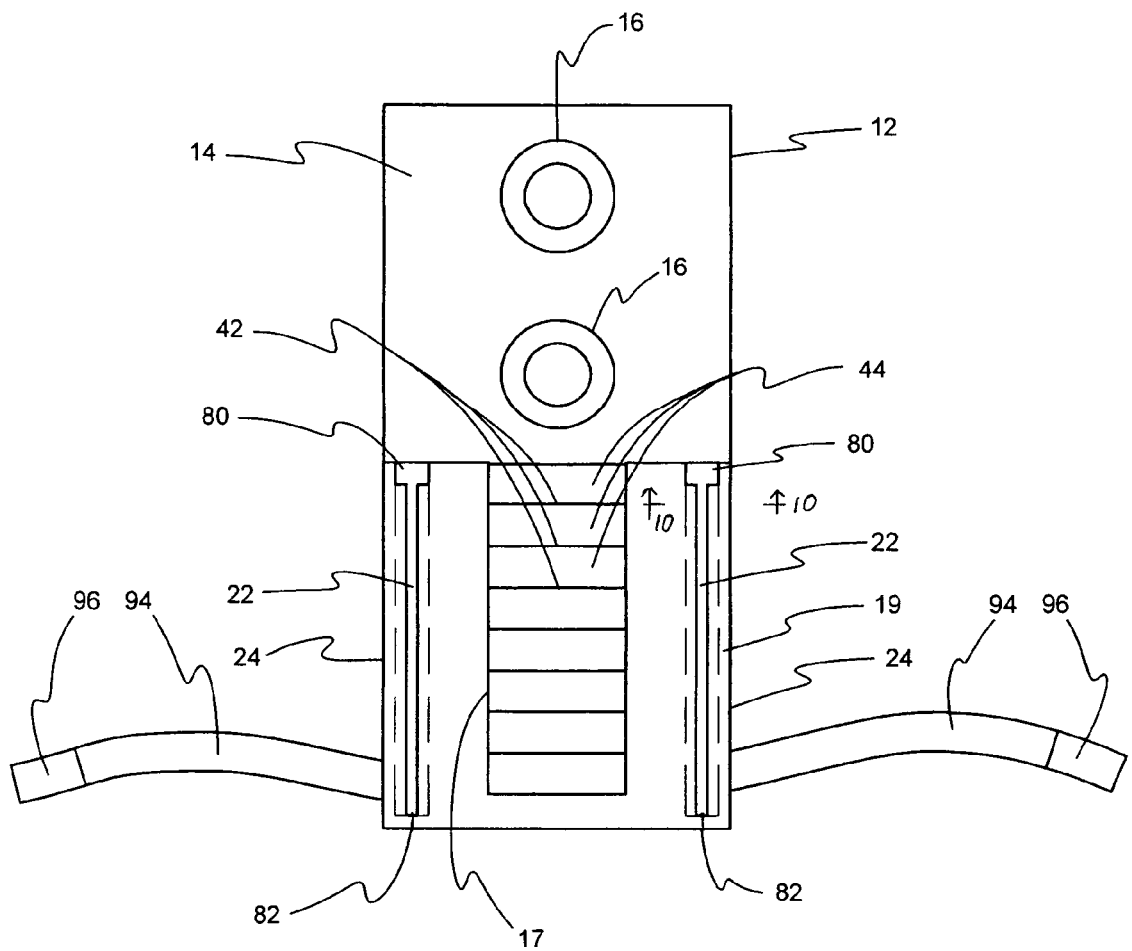
FIG. 3 is a front elevation view of a first member of the device of FIG. 1 in accordance with the present invention.

Referring now to the drawings, a device for supporting and vertically adjusting the position of a picture or other object (not depicted) after the device is secured to a support structure is denoted by numeral 10. The device 10 is fabricated from carbon steel and includes a first or corrugated member 12 having a substantially rectangular configuration with an upper portion 14 with two apertures 16 therethrough to receive fasteners 18 (preferably flathead woodscrews) that secure the first member 12 to a wall or similar support structure. The first member 12 includes a corrugated surface 17 formed in a planar wall 20 of a lower portion 19 between channels 22 formed in opposing edge portions 24 of the lower portion 19. The device 10 further includes an object supporting second member 26 that is slidably and removably secured to the first member 12 via skate members 28 inserted in the channels 22 of the first member 12 to ultimately adjust the vertical position of the object after the first member 12 is secured to the support structure and after the second member 26 is removably secured to the first member 12. The skate members 28 are joined to arcuate rod receiving members 30 and 31 that are integrally joined to an upper end 32 of a plate portion 34 of the second member 26. An annular hanger member 36 is joined to a lower end 38 of the plate portion 34 to removably receive a substantially "D" configured hanger 40 that supports the object.

Figure 4:
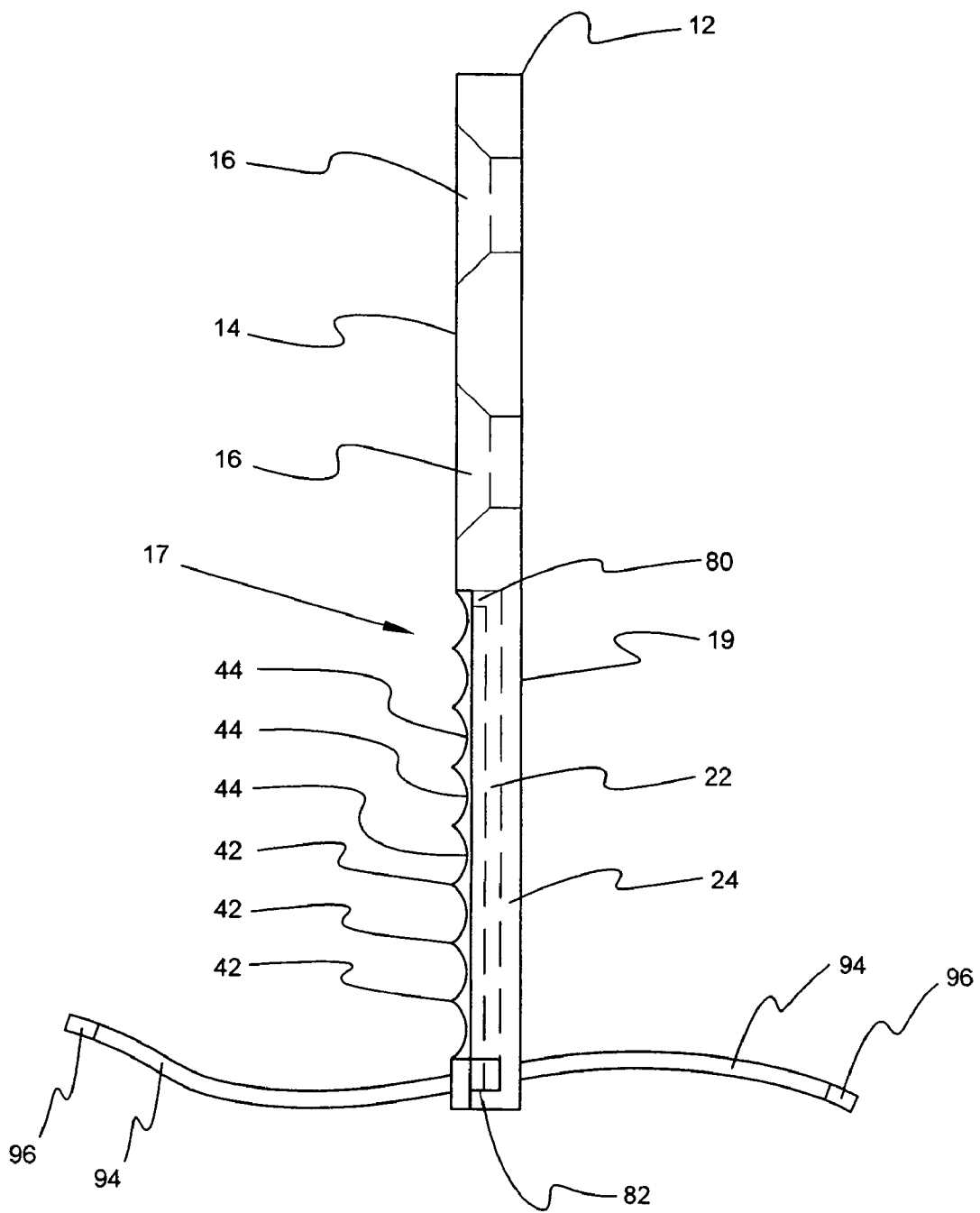
FIG. 4 is a side elevation view of the first member of FIG. 3.
Figure 5:
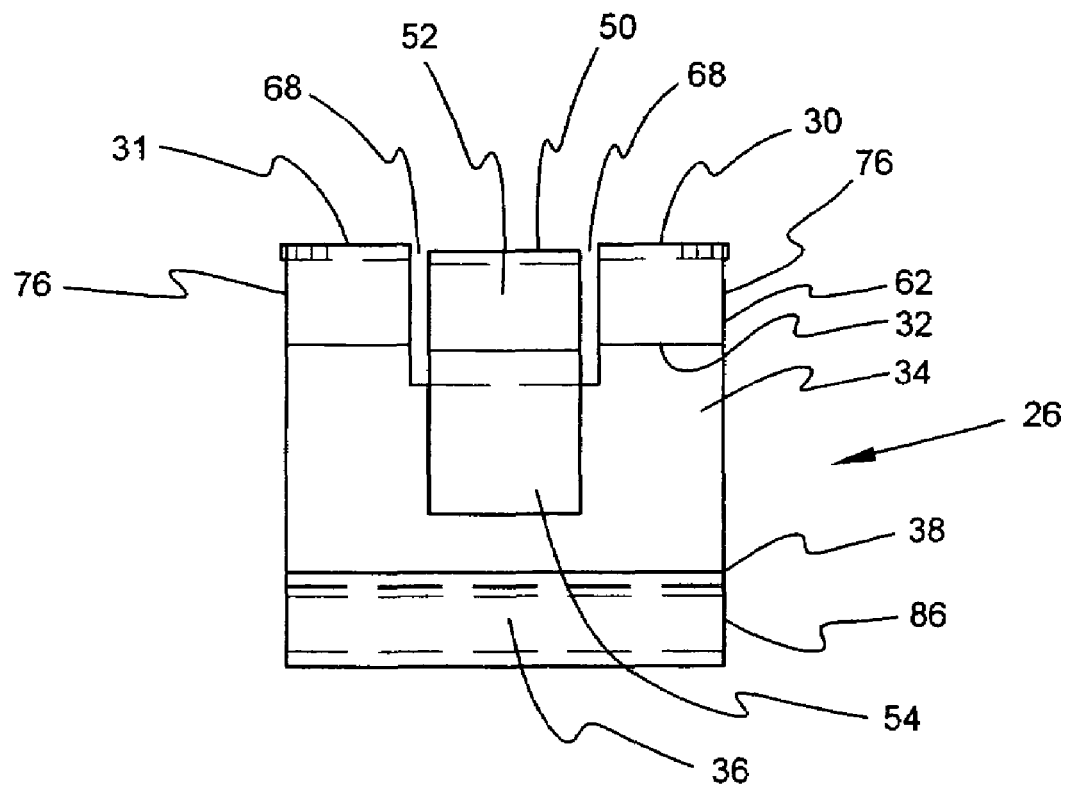
FIG. 5 is a front elevation view of a second member of the device of FIG. 1 in accordance with the present invention.
Figure 6:
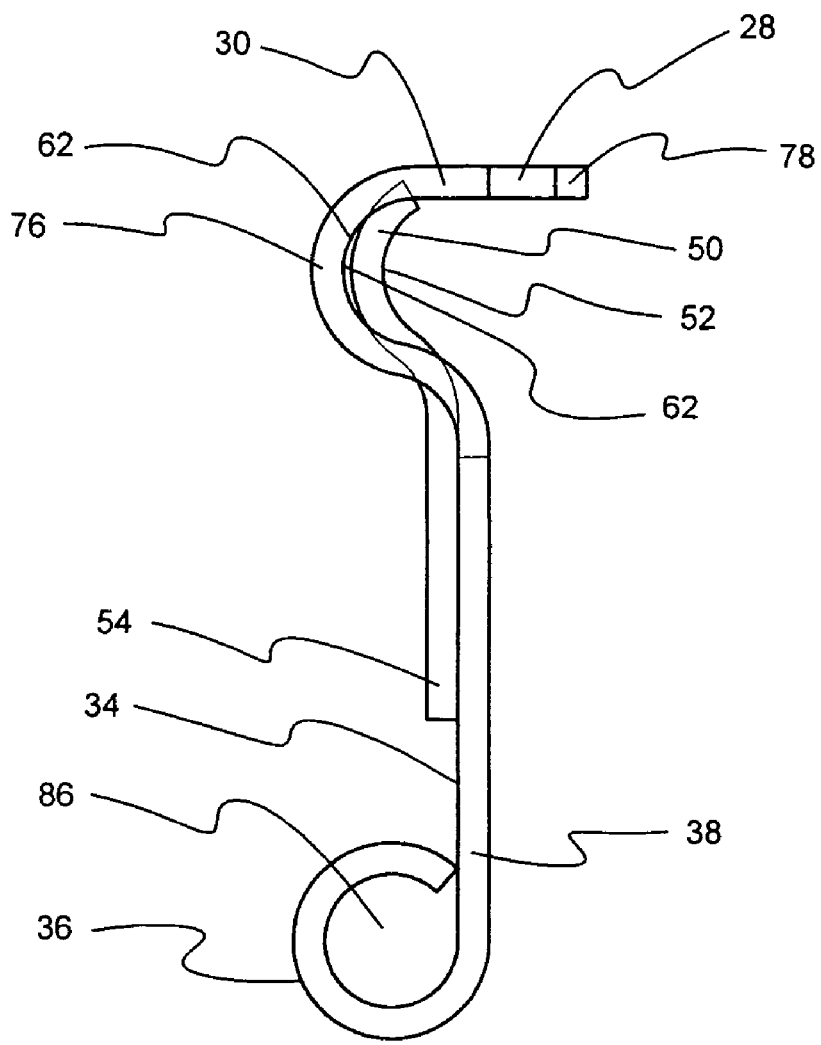
FIG. 6 is a side elevation view of the second member of FIG. 5.
Figure 7:
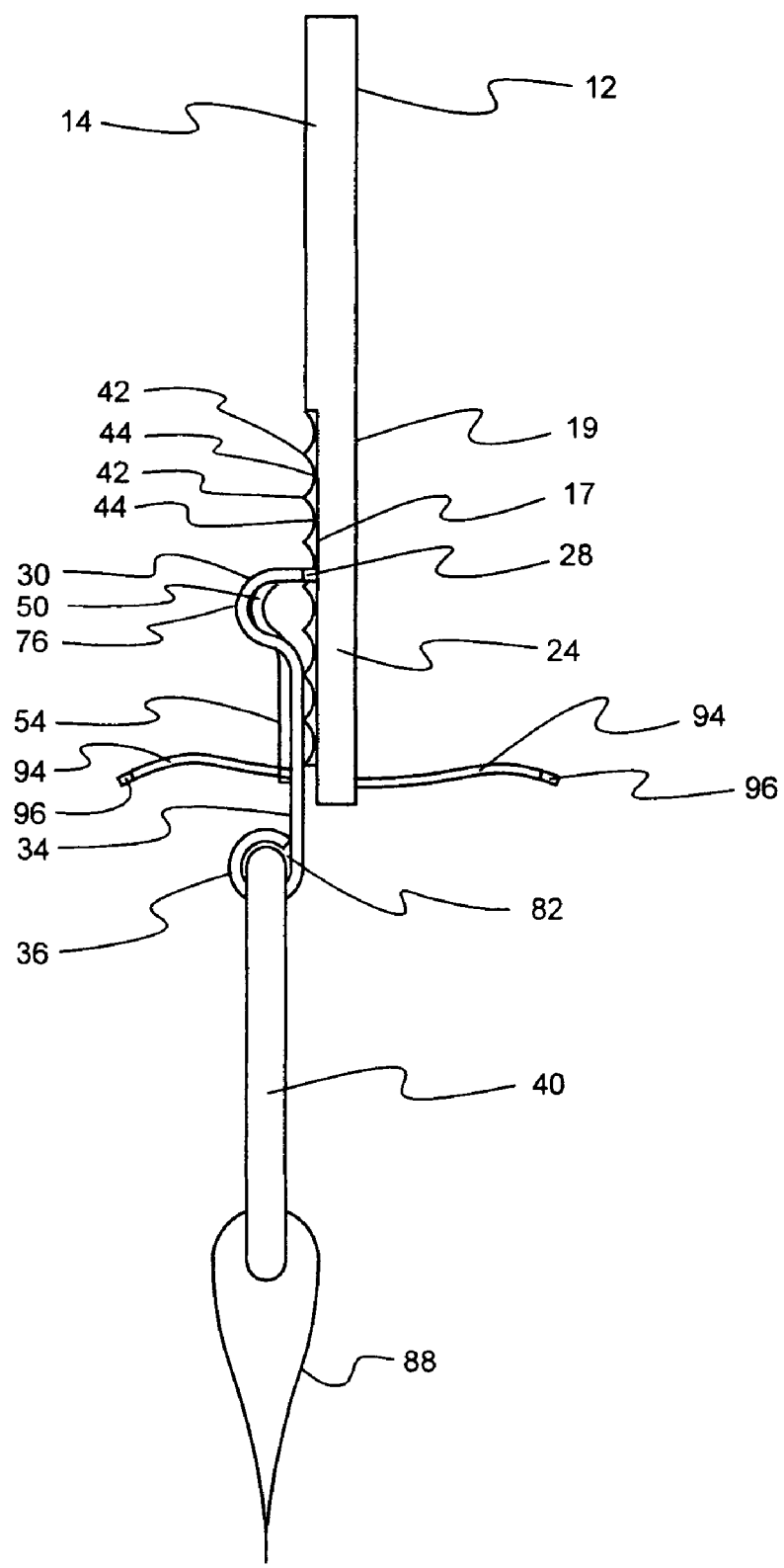
FIG. 7 is a side elevation view of the first and second members secured together without a locking rod therebetween.
Figure 8:
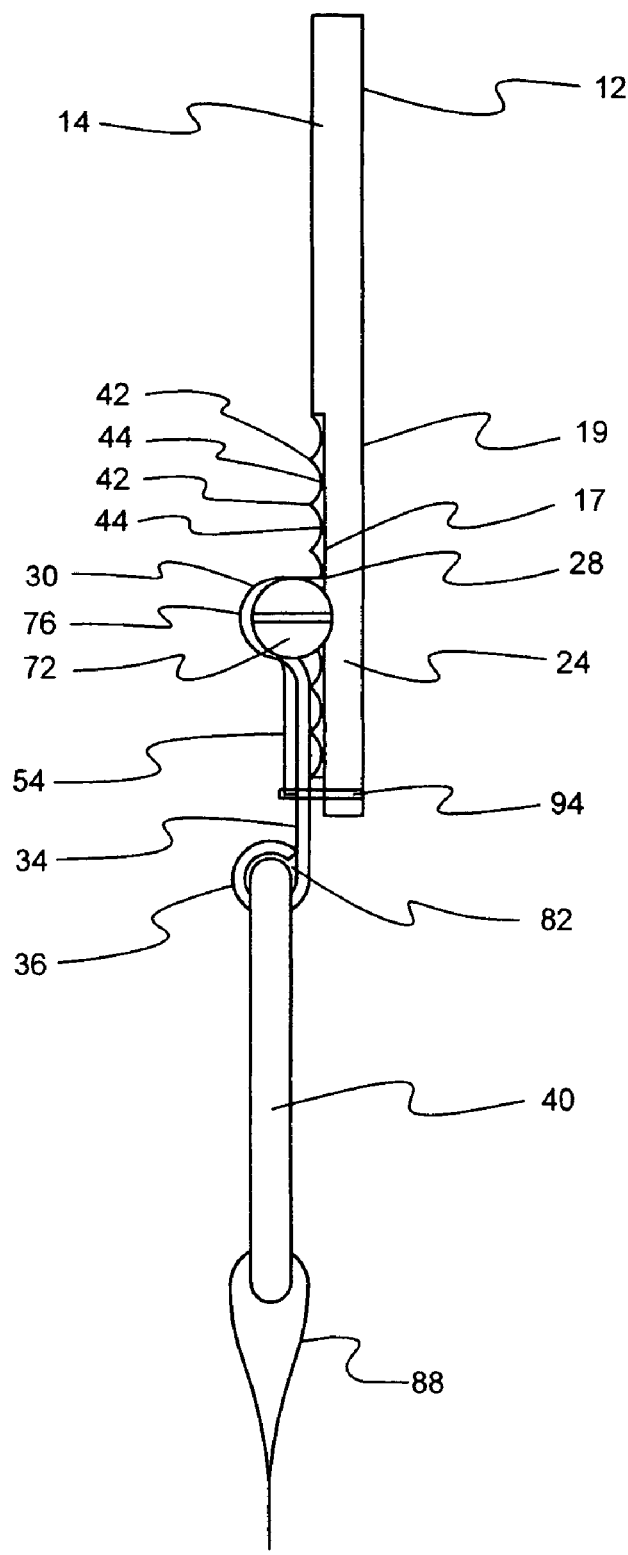
FIG. 8 is a side elevation view of the first and second members secured together with a locking rod therebetween.
Figure 9:
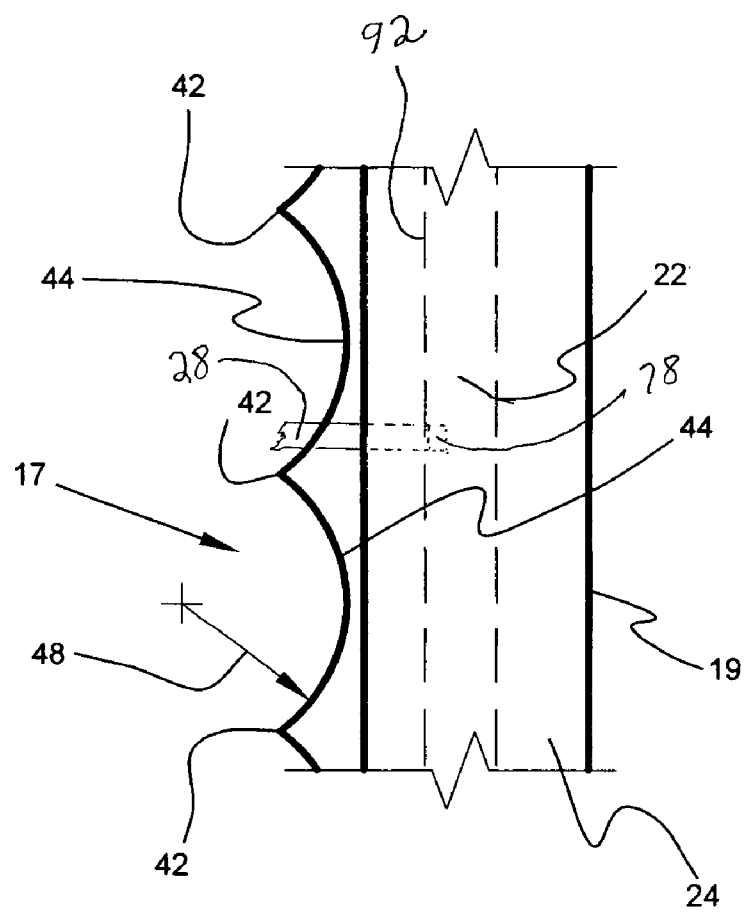
FIG. 9 is a partial side and phantom view of an arcuate depression and adjacent channel that slidably receives a skate member.

The first member 12 is vertically secured to an interior wall of a dwelling and preferably to a wooden framework (such as two-by-fours) that form the walls under a plaster or plasterboard surface; the fasteners 18 being sufficiently long to extend through the plaster and penetrate the wooden structure to a depth that will support the object ultimately secured to the hanger 40. The first member 12 is secured to the interior wall such that the two apertures 16 are vertically aligned and the channels 22 are vertically disposed. The corrugated surface 17 on the lower portion 19 of the first member 12 includes a plurality of longitudinally aligned alternating ridges 42 and parallel arcuate (when taking a side view, see FIGS. 4 and 9) depressions 44 that are adjacent and perpendicular to the channels 22. The ridges 42 and arcuate depressions 44 are horizontally disposed when the two apertures 16 are vertically aligned. The ridges 42 and arcuate depressions 44 are longitudinally dimensioned to cooperatively engage corresponding portions of a locking rod 46.

Figure 10:
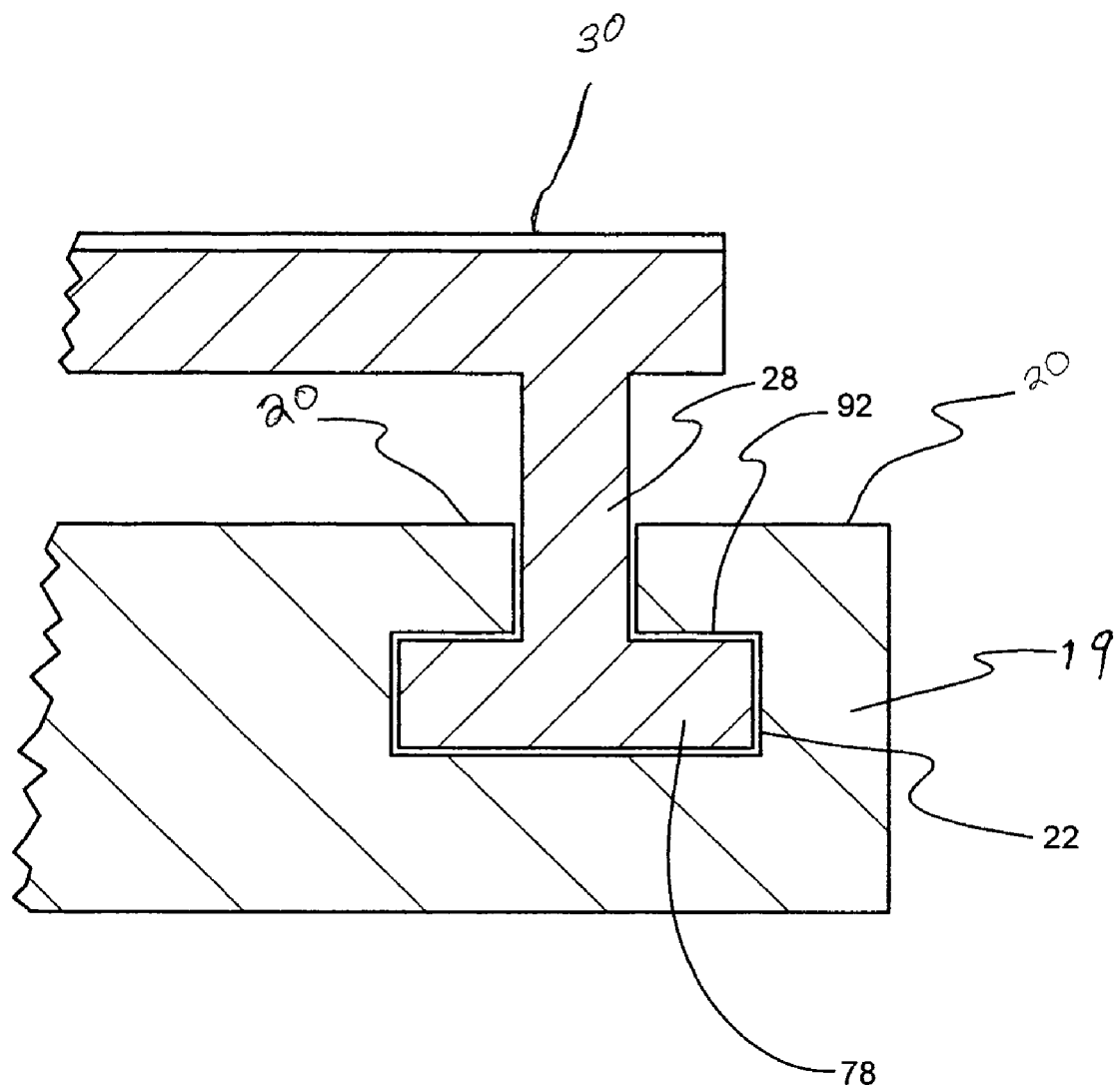
FIG. 10 is a sectional view taken along line 10-10 of FIG. 3 of a channel of a first member, but with a slide portion of a second member inserted in the channel in accordance with the present invention.

The corrugated surface 17 of the first member 12 is molded into or integrally jointed to the lower portion 19 such that the arcuate depressions 44 and the ridges 42 cooperate to form a semi-circular configuration (see FIG. 9) having a radius 48 substantially the same as the radius of the locking rod 46 to promote the maintaining of a selected vertical position of the second member 26 and the object secured thereto. The skate members 28 of the second member 26 are substantially "T" configured and include a slide portion 78 that snugly inserts into a skate receiving recess 80 disposed at a top end of each channel 22. The slide portions 78 have horizontal dimensions and cross-sectional configurations (see FIG. 10) that cooperate with the cross-sectional configuration of the channels 22 such that the slide portions 78 are horizontally retained within and allowed to vertically or lineally slid through the channels 22 as the second member 26 is vertically urged to a selected position. A stopping wall 82 disposed at a bottom end of each channel 22 prevents the slide portions 78 from falling from the bottom ends of the channels 22.

The second member 26 is substantially rectangular and includes an arcuate retaining clip 50 disposed adjacent to and in between the arcuate rod receiving members 30. The arcuate retaining clip 50 includes and arcuate portion 52 integrally joined to a planar portion 54 which is congruently joined to the plate portion 34 of the second member 26. The arcuate portion 52 has a radius substantially the same as the radius of the locking rod 46, the arcuate portion 52 being disposed such that the maximum distance between the arcuate portion 52 and a selected arcuate depression 44 in the corrugated surface 17, is relatively smaller than the radius of the locking rod 46. The arcuate rod receiving members 30 and 31 have a radius substantially the same as the radius of the locking rod 46, the members 30 and 31 being disposed such that the maximum distance between the rod receiving members 30 and 31, and a selected arcuate depression 44 in the corrugated surface 17, is slightly greater than the radius of the locking rod 46.

The locking rod 46 includes a cylindrical insertion portion 56 having a threaded end 57 with a radius relatively smaller than the distance separating the arcuate portion 52 of the retaining clip 50 and a selected arcuate depression 44. The threaded end 57 of the insertion portion 56 is rotationally received by internal threads of a receiving portion 58 of the locking rod 46. The insertion portion 56 is longitudinally configured such that an outer cylindrical wall 60 engages an inner cylindrical wall 62 of a preselected arcuate rod receiving member 30, and also engages an inner cylindrical wall 64 of the arcuate portion 52 of the retaining clip 50, the outer cylindrical wall 60 disposing a tapered end wall 66 in the gap 68 between the retaining clip 50 and the opposing arcuate rod receiving member 31. The arcuate rod receiving members 30 and 31, and the arcuate portion 52 of the retaining clip 50 cooperate with the ridges 42 and arcuate depressions 44 to maintain the locking rod 46 at a selected vertical position thereby securing the vertical position of the object attached to the hanger 40 which is connected to the second member 26.

Maintaining the vertical position of the locking rod 46, is accomplished by inserting the threaded end 57 of the insertion portion 56 between the arcuate rod receiving member 30 and a selected arcuate depression 44 until the tapered end wall 66 of the insertion portion 56 engages and forcibly bends the arcuate portion 52 of the retaining clip 50 opposite from the arcuate depression 44 until the tapered end wall 66 is disposed in the gap 68 between the arcuate portion 52 of the retaining clip 50 and the opposite arcuate rod receiving member 31. The receiving portion 58 of the locking rod 46 is inserted between the arcuate rod receiving member 31 and rotated upon and secured to the threaded end 57 of the insertion portion 56 until the end 70 of the receiving portion 58 engages the tapered end wall 66 thereby disposing the end 70 in the gap 68 and tightly joining the insertion portion 56 and receiving portion 58 together. Each of the insertion and receiving portions 56 and 58 include slotted heads 72 that allow hand tools to impart rotational force upon each portion 56 and 58 until inner walls 74 of each head 72 forcibly engage outer knurled edges 76 of the arcuate rod receiving members 30 and 31 thereby preventing the locking rod 46 from rotationally loosening after the insertion and receiving portions 56 and 58 of the locking rod 46 have been forcibly joined together.

The substantially "D" configured object support hanger 40 includes opposing insertion ends 84 that are forcibly separated and allowed to resiliently insert into corresponding receiving apertures 86 in the annular hangar member 36 of the second member 26. The "D" configuration of the hanger 40 and the weight of the supported object cooperate to slidably position an object support strap 88 at a midpoint 90 of the hanger 40 thereby aligning the support strap 88 with a central axis of the first and second members 12 and 26 to provide maximum vertical adjustability for the device and minimum damage to the support structure.

In operation, a device 10 for supporting and vertically adjusting the position of an object after the device 10 is vertically secured to a support structure, is sized such that the vertical dimension of a corrugated surface 17 is sufficient to correspondingly position the object within a predetermined elevation range. A first member 12 of the device 10 is secured to a support structure such that alternating ridges 42 and arcuate depressions 44 are horizontally aligned thereby vertically disposing adjacent channels 22 that slidably receive skate members 28 of a second member 26 of the device 10, the second member supporting the object via a hangar member 40. The skate members 28 are vertically slid to a selected vertical position that disposes the object at a corresponding vertical elevation required by an individual. While holding the second member 26 and the object connected thereto at the selected elevation, the individual inserts the threaded end 57 of an insertion portion 56 of a locking rod 46 between an arcuate rod receiving member 30 and an adjacent horizontal arcuate depression 44 until a tapered end wall 66 of the insertion portion 56 forcibly separates an arcuate portion 52 of a retaining clip 50 from the arcuate depression 44, the end wall 66 ultimately being disposed in a gap 68 separating the retaining clip 50 from an arcuate rod receiving member 31. Should the arcuate depression 44 not be exactly opposite the rod receiving member 30, then the second member 26 must be moved until the rod receiving member 30 is disposed opposite to the nearest arcuate depression 44. After inserting the insertion portion 56 of the locking rod 46, a receiving portion 58 of the locking rod 46 is inserted between the selected arcuate depression 44 and the arcuate rod receiving member 31 until the receiving portion 58 rotationally engages and is tightly joined to the insertion portion 56 thereby securing the vertical position of the object without requiring added fasteners to join the second member 26 to the support structure and preventing added damage to the plaster or plasterboard surface of the support structure.

Ordinarily, the force of the locking rod 46 pushing the retaining clip 50 outward from the arcuate depression 44 and correspondingly pushing the skate members 28 against an inner wall 92 of the channels 22, is sufficient to maintain the vertical elevation of the object being supported. However, should the weight of the object become excessive, the vertical retention forces of the device 10 would be overcome resulting in the downward slippage of the second member 26 until the skate members 28 engaged the stopping walls 82 of the channels 22. The slippage of the heavy object is prevented by adding retaining straps 94 to each edge portion 24 near the stopping wall 82 of the lower portion 19 of the first member 12. The retaining straps 94 wrap around the second member 26 and snugly hold a portion (that varies with the vertical position of the skate members 28) of the second member 26 against the first member 12. The retaining straps 94 minimizes the distance separating the first and second members 12 and 26 thereby increasing the bending of the holding clip 50 away from the arcuate depression 44 by the locking rod 46 and correspondingly increasing the holding force of the holding clip 50 upon the locking rod 46. The ends 96 of the straps 94 are detachably secured together around the second member 26 via velcro or similar securing means such that the non-deformable material of the straps 94 continually and tightly holds the second member 26 against the first member 12 irrespective of the weight of the object supported by the hanger 40.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A device for supporting and vertically adjusting the position of an object after the device is secured to a support structure comprising:
   a first member having a corrugated surface and secured to a support structure at a predetermined position;
   a second member removably secured to said first member, said second member including means for supporting an object, at least one arcuate rod receiving member disposed at an upper end, and an annular hanger member disposed at a lower end;
   means for adjusting the vertical position of the object after said first member is secured to the support structure and after said second member is removably secured to said first member, said adjusting means including a skate member joined to said arcuate rod receiving member, said skate member ultimately being inserted into a skate receiving recess of a channel in said first member whereby the configurations of said skate member and said channel cooperate to promote lineal motion of said skate member; and
   means for maintaining a selected vertical position of the object, said position maintaining means engaging only said first and second members, said position maintaining means comprising:
   an arcuate retaining clip disposed adjacent to said arcuate rod receiving member; and
   a locking rod inserted between said arcuate rod receiving member and said corrugated surface, and between said retaining clip and said corrugated surface.

2. The device of claim 1 wherein said first member includes at least one aperture disposed in an upper portion, said aperture ultimately receiving a fastener therethrough to secure said first member to the support structure.

3. The device of claim 1 wherein said corrugated surface includes a plurality of alternating ridges and parallel arcuate depressions, said first member being secured to the support structure such that said ridges and arcuate depressions are horizontally disposed.

4. The device of claim 3 wherein the at least one channel is disposed adjacent to and perpendicularly to said ridges and arcuate depressions.

5. The device of claim 4 wherein said channel includes an upper end a lower end having a stopping wall.

6. The device of claim 5 wherein said skate receiving recess is configured such that the horizontal dimension of said skate receiving recess is relatively larger than the horizontal dimension of the skate member.

7. The device of claim 1 wherein said object support means includes means for aligning an object support strap with a central axis of said second member.

8. The device of claim 7 wherein said aligning means includes a substantially "D" configured hanger.

9. The device of claim 1 wherein said arcuate retaining clip is configured such that a maximum distance between said arcuate retaining clip and an arcuate depression in the corrugated surface is relatively smaller than a radius of said locking rod.

10. The device of claim 9 wherein said arcuate rod receiving member is configured such that a maximum distance between said arcuate rod receiving member and said arcuate depression in said corrugated surface is relatively greater than the radius of said locking rod.

11. The device of claim 1 wherein said locking rod includes a threaded end to promote the insertion of said locking rod between said arcuate rod receiving member and an arcuate depression in said corrugated surface.

12. The device of claim 1 wherein said locking rod includes a threaded end to promote the insertion of an insertion portion of said locking rod between said arcuate retaining clip and an arcuate depression in said corrugated surface, the continued insertion of said threaded end and a tapered end wall of the insertion portion of said locking rod ultimately forcing said arcuate retaining clip from said selected depression thereby forcibly maintaining the position of said locking rod in said selected depression after said locking rod has been inserted to a predetermined position between said arcuate rod receiving member and said selected depression, and between said arcuate retaining clip and said arcuate depression.

13. The device of claim 12 wherein said insertion of said locking rod correspondingly urges said skate member against retaining walls in said channel thereby maintaining the vertical position of said second member while supporting an object secured thereto via said hanger.

14. The device of claim 13 wherein the vertical position of the object is varied by forcibly removing said locking rod from said arcuate retaining clip and said arcuate rod receiving member, vertically elevating or lowering said second member by vertically sliding said skate within said channel to an alternative position, and reinserting said locking rod between said arcuate rod receiving member and an second arcuate depression in said corrugated surface, and continuing the insertion of said locking rod between said retaining clip and said second arcuate depression until the locking rod is disposed to maintain a new vertical position of the supported object.

15. The device of claim 1 wherein said locking rod includes insertion and receiving portions cooperatively threaded, each portion having a slotted head whereby one or both of said insertion and said receiving portion may be forcibly rotated to separate said insertion and receiving portions to facilitate the vertical adjustment of said second member to vertically position the object connected to said second member.

16. The device of claim 15 wherein said arcuate rod receiving member includes a knurled edge that ultimately engages an inner wall at least one of the slotted heads, said knurled edge preventing said locking rod from rotationally loosening after said insertion and receiving portions of said locking rod have been forcibly joined together.

17. A device for adjusting the vertical position of an object hung on a wall without damaging the wall comprising:
   a corrugated member secured to the wall, said corrugated member having a vertical channel proximate to each vertical side of a corrugated surface of said corrugated member;
   a vertically adjustable support member slidably secured via skate members to said vertical channels;
   a hanger secured to a lower portion of said support member; and
   a locking rod removably secured between said corrugated member and said support member, said locking rod maintaining a selected vertical position of the object after said support member has been vertically slid to a position corresponding to said selected vertical position of the object, said maintaining of said selected vertical position of the object occurring without attaching said support member to the wall, said vertical channels and said support member promoting the disposition of said locking rod upon a front side of said corrugated member, thereby promoting access to said locking rod by an individual adjusting the vertical position of said support member, and allowing said corrugated member to be attached to a wall surface to minimize the distance separating the object from the wall surface.

18. The device of claim 17 wherein said support member comprises:
   at least one arcuate rod receiving member disposed at an upper end,
   an arcuate retaining clip disposed adjacent to said arcuate rod receiving member; and
   wherein the locking rod is inserted between said arcuate rod receiving member and said corrugated surface, and between said retaining clip and said corrugated surface.

19. A method for adjusting the vertical position of an object while hanging from a wall, said method comprising the steps of:
   securing a first member upon a preselected portion of the wall;
   providing a corrugated surface upon said first member;
   disposing an arcuate retaining clip on a second member;
   disposing an arcuate rod receiving member adjacent to said arcuate retaining clip;
   slidably securing the second member to said first member;
   providing means for securing the object to said second member; and
   maintaining a selected vertical position of said second member relative to said first member without securing said second member to the wall, said step of maintaining a selected vertical position includes the steps of:
   joining a skate member to the arcuate rod receiving member, said skate member ultimately being inserted into a skate receiving recess of a channel in said first member, whereby the configurations of said skate member and said channel cooperate to promote lineal motion of said skate member;
   inserting a locking rod between an exposed portion of said first member and said second member while said second member is slidably secured to said first member, and while said first member is secured to the wall, whereby said locking rod is accessible to an individual to promote the vertical positioning of said locking rod upon said first member, and the distance separating the object from the wall is minimized, wherein said arcuate rod receiving member and said corrugated surface cooperating to removably receive said locking rod, and said retaining clip and said corrugated surface cooperating to removably receive said locking rod.

\* \* \* \* \*